Patented May 6, 1952

2,595,348

UNITED STATES PATENT OFFICE 2,595,348

PROCESS OF PRODUCING BENZANTHRONE FREE FROM ANTHRAQUINONE IMPURITIES

Maurice H. Fleysher, Buffalo, and Frederic L. Sievenpiper, Alden, N. Y., assignors to Allied Chemical & Dye Corporation, New York, N. Y., a corporation of New York No Drawing. Application July 7, 1948, Serial No. 37,506

4 Claims. (Cl. 260—364)

This invention relates to manufacture of benzanthrone from anthraquinone and more particularly to the manufacture of benzanthrone by heating anthraquinone and glycerine or its equivalent in a sulfuric acid reaction medium in the presence of iron, copper, or mixed iron-copper reducing agent.

Benzanthrone is an intermediate in syntheses of a commercially important line of vat dyes. A problem in the manufacture of benzanthrone intermediate by the above-noted route has been the elimination of certain impurities which, during subsequent conversion of the benzanthrone to vat dyestuffs, form products which degrade the dyeing qualities such as dye-strength, brightness and fastness of shades imparted by the final benzanthrone-derived dyestuffs. These impurities apparently are related to anthraquinone since like anthraquinone they can be vatted, and in the vatted form they resemble vatted anthraquinone in color. The said impurities are dissimilar to anthraquinone, however, in that under the conditions ordinarily employed in the past for synthesis of benzanthrone from anthraquinone they condense only very slowly if at all with glycerine or its equivalent acrolein. These impurities derived from anthraquinone are nearly always present in undesirable quantities in crude benzanthrone which is made by the prior art condensation of anthraquinone with glycerine or acrolein in hot sulfuric acid containing a metallic reducing agent.

The said anthraquinone-like impurities are surmised to result from reduction products of anthraquinone which do not condense with glycerine or acrolein to form benzanthrone. They are hereinafter referred to, however they may be derived from anthraquinone, as "anthraquinone bodies."

Collectively the anthraquinone bodies and anthraquinone itself are hereinafter referred to as anthraquinone-type reactants or anthraquinone-type impurities.

Purification procedures, such as solvent extractions, which have been previously employed for removing anthraquinone bodies from benzanthrone, are tedious and costly. Numerous variations of the preparation of benzanthrone by the outlined method of heating a sulfuric acid mixture of anthraquinone, glycerine and a reducing metal, have been effected with a twofold purpose: firstly, to inhibit formation of anthraquinone bodies which do not react with the glycerine and appear as anthraquinone-like impurities in the benzanthrone, and secondly to increase the benzanthrone yield. The more effective of these processes involve expensive reagents and complicated control of conditions; but so far as we are aware, none of these methods result in benzanthrone which is consistently free from undesirable amounts of anthraquinone bodies.

An object of our invention is to provide a process for manufacturing benzanthrone from anthraquinone which process consistently yields benzanthrone containing at most negligible quantities of anthraquinone bodies.

Another object is to provide a simple process for substantially eliminating anthraquinone-type impurities from a crude benzanthrone containing them; and at the same time to raise the final yields of benzanthrone by converting to benzanthrone substantially all anthraquinone-type impurities originally present in said crude benzanthrone.

Other objects and advantages will appear hereinafter.

We have now found that anthraquinone may be condensed with glycerine or its equivalent in sulfuric acid medium in presence of iron powder or copper powder or a mixture of these reducing agents to obtain high yields of benzanthrone which is not degraded by presence therein of anthraquinone bodies. Furthermore, we have found that anthraquinone bodies contained in benzanthrone may be conditioned so that they are capable of condensing with glycerine or its equivalent in sulfuric acid medium in presence of above reducing agent to form additional quantities of benzanthrone. These desirable results are obtained when the reduction-condensation reaction is effected under the following combination of reaction conditions: (1) the sulfuric acid reaction medium must be sufficiently concentrated to dissolve anthraquinone-type reactant at the reaction temperatures; (2) the temperatures of reaction must be between about 122° and about 134° C.; (3) a conditioning agent which probably acts as a mild oxidizing agent, stronger as such than anthraquinone itself but not strong enough to oxidize the benzanthrone product, must be present in the sulfuric acid solution of anthraquinone-type reactant, desirably at the start of the reduction-condensation reaction; and (4) glycerine or equivalent and reducing agent must be provided in the reaction mixture together, so that reduction and condensation reactions occur substantially simultaneously.

In order to obtain a desirably concentrated solution of the anthraquinone-type reactant in sulfuric acid at the prescribed reaction temperatures, the acid strength (weight percent of 100% sulfuric acid in the mixture of sulfuric acid and all water formed and added) should be above 80%. However, the acid strength during the reduction-condensation reaction should not exceed 91%, since use of more concentrated sulfuric acid effects sulfonation and reduces the ultimate yield of benzanthrone. Preferably the acid is adjusted to about 87% to 90% strength; and about 5–10 parts of acid (100% $H_2SO_4$ basis) per part of starting material treated are then employed to effect solution of the starting material at reaction temperatures. Preferred quantities of 87%–90% sulfuric acid are about 5 to 7 parts (100% $H_2SO_4$ basis) per part of anthraquinone or benzanthrone plus anthraquinone-type reactants taken as starting material.

The reaction temperatures for the reduction-condensation step of our process are between about 122° and about 134° C., preferably between 124° and 130° C. At temperatures lower than about 122° C. the solution of starting material is of undesirably low concentration and the reaction is slow; while at temperatures above about 134° C., benzanthrone and the anthraquinone-type reactants are subject to sulfonation with corresponding reduction in yields of benzanthrone.

The conditioning agents which are applicable in accordance with our invention are mild oxidizing agents. They do not exhibit oxidizing action on benzanthrone under the reaction conditions but they are stronger oxidizing agents than anthraquinone. Among conditioning agents of suitable oxidation potential are cupric sulfate, alkali metal nitrites and water-soluble organic mono-nitro and mono-nitroso compounds such as the mono-nitrobenzene sulfonates and mono-nitroso phenol. Cupric sulfate is preferred as being both effective and readily available. It is normally employed in the form of its pentahydrate, $CuSO_4.5H_2O$.

The conditioning agent, e. g. cupric sulfate, is suitably employed in small quantities, which may be as little as, for example, about 0.07 mol of cupric sulfate per mol anthraquinone-type reactant. Larger amounts, for example 2 mols of agent per mol anthraquinone-type reactant, may be employed without adverse effect on benzanthrone yields. The most suitable quantity of conditioning agent to employ in a given run will depend to some extent on whether the starting material is anthraquinone itself or is a crude product containing anthraquinone-type impurities.

When anthraquinone is the starting material, the amount of cupric sulfate employed is preferably between about 0.1 mol and about 0.5 mol per mol of anthraquinone. Somewhat more conditioning agent per mol of anthraquinone-type reactants (calculated as anthraquinone) is usually required for a crude product containing anthraquinone-type impurities than for anthraquinone itself as starting material: suitable quantities of cupric sulfate, per mol of anthraquinone-type reactants (calculated as anthraquinone) in a crude product are usually about 0.5 to about 2 mols. The larger ratios apply in particular to reaction mixtures in which the proportion of anthraquinone-type reactants is low.

When another conditioning agent is employed instead of cupric sulfate in accordance with our invention, the molar proportion employed may be the equivalent in oxidizing capacity of the proportions applicable for cupric sulfate. Theoretically one mol of cupric sulfate can oxidize two atoms of hydrogen; and one mol of mono-nitrobenzene sulfonate can oxidize six atoms of hydrogen. Hence for purposes of the process of this invention one mol of mono-nitrobenzene sulfonate may be considered equivalent to 3 mols of cupric sulfate. Likewise one mol of alkali metal nitrite is equivalent to 1½ mols and one mol of mono-nitrosophenol is equivalent to two mols of cupric sulfate.

Desirably, the conditioning agent is added to the reaction mixture before any reaction has begun.

Cupric sulfate present in the solution serves the function, among others, of activating iron reducing agent which in the absence of an activator is sluggish in its reducing action on anthraquinone. Copper powder mixed with the iron powder will also serve to activate the iron reducing agent. However, even though copper forms copper sulfate with the sulfuric acid reaction medium, neither copper powder nor copper sulfate which is formed therefrom in the sulfuric acid reaction medium is the equivalent of the conditioning agent, such as cupric sulfate used in our process.

The reducing agent employed in accordance with our process is iron powder or copper powder or a mixture thereof. A commercial ground iron which is ground to a fineness between 100 and 160 mesh is preferred since coarser grades act slowly and finer grades cause excessive foaming in the reaction mixture.

The total quantity of reducing agent added is suitably at least about 2 atoms per mol of anthraquinone-type reactant and may be more. When anthraquinone itself is the starting material the total quantity of the preferred iron reducing agent added is usually between about 2 and about 3.25 atoms, preferably about 2.5 atoms of iron per mol of anthraquinone. Usually more reducing agent than for converting anthraquinone itself is best suited for converting to benzanthrone a like number of mols of anthraquinone-type impurities in a crude benzanthrone; about 3 or more atoms of reducing agent, e. g. 3 to 9 atoms, per mol of anthraquinone-type impurities (calculated as anthraquinone) are usually suitable quantities to promote satisfactorily rapid conversion of anthraquinone-type impurities to benzanthrone.

As noted above, copper powder serving as an activator for iron, or replacing the iron, may be employed. If copper is used, the amount of iron used may be correspondingly reduced. The use of copper is most appropriate in treating anthraquinone-type impurities in a crude benzanthrone since then impurities are the materials being converted, so that only relatively small amounts of reducing agent, on the basis of the total benzanthrone product, need be used. The extra expense of copper as against iron is then a less important consideration than when anthraquinone itself is the starting material.

In our process the reduction and the condensation reactions are effected substantially simultaneously. Processes in which the reduction is carried out in a first step and the condensation in a subsequent step are less convenient than our process and do not consistently produce benzanthrone free of anthraquinone-type impurities.

To obtain substantially simultaneous reduction and condensation reactions we provide glycerine or its equivalent and our reducing agent together, in the solution of anthraquinone-type reactants and conditioning agent at the reaction temperatures. Suitably, in our process the glycerine and reducing agent are added simultaneously, e. g. as a uniform mixture, to the solution of reactants and conditioning agent at reaction temperature; but alternatively, some or all of the glycerine may be added first and suitable quantities of reducing agent may thereafter be added below or at reaction temperatures.

Total quantities of added glycerine as low as about 1.1 mols per mol of anthraquinone are sufficient to convert anthraquinone starting material to benzanthrone in yields of 88% of theoretical, or higher. Preferably the proportion of glycerine used with anthraquinone starting material is 1.1—1.5 mols, e. g. about 1.25 mols per mol of anthraquinone present. For conversion to benzanthrone of anthraquinone-type impurities in a crude benzanthrone, somewhat more glycerine per mol of anthraquinone-type reactant is usually suitable: for example, about 1.5–5 mols of glycerine per mol of anthraquinone-type impurities (calculated as anthraquinone) are usually suitable quantities.

The rate of addition of the reducing agent (or mixture thereof with glycerine) to the solution of reactants and conditioning agent is suitably controlled to avoid excessive foaming of the reaction mixture.

After all reducing agent and glycerine have been added the reaction mixture may be agitated at the reaction temperatures until a sample shows a negative test for anthraquinone-type impurities. Benzanthrone may then be recovered from the reaction mixture by conventional procedures such as drowning the reaction mixture in hot water, diluting further with cold water, filtering, washing and drying.

An anthraquinone-type reactant which may be converted to benzanthrone by our process may be derived from a variety of sources. It may be anthraquinone itself, either in pure or crude form; or a crude anthraquinone in sulfuric acid reaction medium as obtained directly from dehydration of ortho-benzoylbenzoic acid with concentrated or fuming sulfuric acid; or a reaction mixture obtained in the conversion of anthraquinone to benzanthrone which mixture contains benzanthrone and anthraquinone-type impurities in sulfuric acid medium; or even crude benzanthrone product, containing anthraquinone-type impurities, isolated from such a reaction mixture. All these and like materials may be treated by our process to form benzanthrone substantially free of anthraquinone-type impurities.

It is well known that in sulfuric acid medium under the temperature conditions employed in our process, glycerine will form acrolein; and that acrolein may be substituted for glycerine in condensation with reduced anthraquinone-forming benzanthrone. Accordingly, acrolein is the equivalent of glycerine for the purposes of our invention.

The following examples are illustrative of our process but are not to be interpreted in a limiting sense. In the examples the test for anthraquinone-type impurities was as follows:

An aliquot portion of the sulfuric acid solution of the products, corresponding to about 10 grams of starting material (benzoylbenzoic acid, anthraquinone or crude benzanthrone), is drowned in water and the aqueous slurry is filtered. The cake is washed first with water until it is free of acid, then with dilute (2%) aqueous soda ash, and finally with water until it is neutral. The neutral cake is weighed; and after it is uniformly mixed, one-tenth thereof is suspended in 200 cc. water. To the suspension 5 cc. of a 50% solution of sodium hydroxide are added and the mixture is carefully heated to the boiling point. 1 gram of sodium hydrosulfite is added, and the mass is boiled for 1 minute, and allowed to stand to settle out non-vattable matter. Anthraquinone-type impurities, if present, are thus converted to a soluble vatted form which imparts a red color to the aqueous solution above the settled unvatted benzanthrone and other non-vattable and insoluble matter.

By comparing the color of the vat solution in the usual manner with standard solutions similarly prepared from known amounts of anthraquinone, the amount of anthraquinone-type impurity (in terms of anthraquinone) in the sulfuric acid solution may be ascertained with sufficient accuracy for applying the purification methods of the invention.

The yield of benzanthrone in the crude products was determined by difference after ascertaining (1) the percent content of anthraquinone-type impurities by extracting vattable matter from the crude benzanthrone with aqueous alkaline sodium hydrosulfite, (2) the percent content of matter insoluble in benzene (i. e. iron, inorganic salts and some organic matter) by extracting the crude benzanthrone with benzene.

*Example 1.*—A solution of 130 parts of ortho-benzoylbenzoic acid in 865 parts of sulfuric acid (100%) was heated to 140° C. and maintained at about that temperature for about 1 hour. The solution was cooled to 50° C. and diluted with a solution of 20 parts of copper sulfate crystals ($CuSO_4.5H_2O$) in 83 parts of water. The concentration of sulfuric acid (in percent by weight of the mixture of $H_2SO_4$ and all water present) at this point was about 89.5%. The reaction mixture was heated to about 125° C. and maintained between 125° and 130° C. while a mixture of 67 parts of glycerine and 86 parts of ground iron of about 100 mesh was added to the agitated mass rapidly but not at a rate such as to produce excessive foaming. Time required for the addition was about 1.5 hours. The mass was stirred for another 0.5–1 hour at about 125°–130° C. At this point a test for presence of anthraquinone-type impurities in the reaction mixture was made and found negative.

The mixture was cooled to about 90°–100° C., drowned in about 1000 parts of water heated to about 70°–80° C., and the aqueous mixture was boiled for about 1 hour, to convert the residual iron to soluble sulfates and to improve filtration characteristics. The reaction mixture was then diluted with cold water to about 10% acid concentration and filtered. The filter cake of crude benzanthrone was washed first with hot water, then with 2% aqueous sodium carbonate solution, and again with water to remove acid and alkali-soluble material; and the wet neutral mass was dried. The yield of benzanthrone in the dry crude was 94% of theory from ortho-benzoylbenzoic acid. The crude product contained no organic impurities which gave a test for anthraquinone or anthraquinone bodies.

When the same procedure was used with the exception that copper sulfate was omitted, tests applied to the acid mass before and after it was drowned in water, and to the dry crude benzanthrone product, indicated the presence in each of considerable amounts of anthraquinone bodies.

*Example 2.*—500 parts of ortho-benzoylbenzoic acid were added to 3000 parts sulfuric acid 100%. The mixture was heated to and maintained at about 140° C. for about 1 hour to form anthraquinone. The mass was cooled to 50° C., diluted with 350 parts water; and heated to 125°–128° C. To the agitated solution at this temperature, an intimate mixture of 327 parts ground iron, 9 parts copper powder and 225 parts of glycerine was added over a period of about 3 hours, and the whole was then agitated at 125°–130° C. for another 3 hours. A test for anthraquinone-type impurities at this point showed anthraquinone bodies to be present in undesirable amount (about 5% by weight of the benzanthrone formed).

20 parts of copper sulfate crystals were added to the above reaction mixture and the mass was agitated at 125°–130° C. for ½ hour. Then a mixture of 36 parts glycerine, 54 parts ground iron and 1 part copper powder was added; and the mass was agitated at 125°–130° C. for 1 hour. At this point anthraquinone-type impurities could not be detected in the mixture. The mass was diluted by drowning in water; the aqueous mass was filtered; and the filter cake was washed and dried as in Example 1. The final product weighed 509 parts, and by analysis contained 87.8 weight per cent benzanthrone, and 12.2 weight per cent insoluble matter, none of which was anthraquinone-type impurity.

Yield of benzanthrone is practically 100% of that theoretically possible from the initial charge of ortho-benzoylbenzoic acid.

*Example 3.*—(a) A mixture of 500 parts ortho-benzoylbenzoic acid in 3000 parts sulfuric acid 100% was heated to about 140° C. and agitated at about that temperature for 1 hour. The mass was cooled to 50° C., diluted with 350 parts water; and heated to 125° C. to obtain complete solution. At 125°–130° C. over a period of 2 hours, there were then added simultaneously in portions 255 parts glycerine and a mixture of 265 parts ground iron 60 mesh, 61 parts ground iron 160 mesh, and 10 parts copper powder 40 mesh. The whole mixture was agitated for 1 hour at 125°–130° C. A sample of the mass at this stage contained anthraquinone bodies. The mass was agitated at 125°–130° C. for 3-4 more hours, and when tested was again found to contain anthraquinone bodies. Additions of more reducing metal mixture and glycerine with continued agitation of the batch at 125°–130° C. were made. Finally the batch was drowned in water, and the produce was isolated, dried and analyzed. The crude benzanthrone thus obtained contained anthraquinone bodies which in terms of anthraquinone, weighed about 15% of the weight of the crude benzanthrone.

(b) To an agitated mixture of 76 parts of the product of part (a) and 500 parts sulfuric acid 100%, 2 parts of sodium nitrobenzene sulfonate and 60 parts water were added. The mass was heated to 125° C. and formed a solution, to which a mixture of 9 parts glycerine, 12 parts iron 100 mesh, and ½ part copper powder was added in small portions over half an hour with temperatures maintained at about 125° C. A test of the mass at this point showed that anthraquinone-type impurities were no longer present. The mass was diluted in water, the aqueous mass was filtered, the cake was washed till neutral, then dried. The resulting dry product by analysis contained 88.6 weight per cent benzanthrone, 11.4 weight per cent impurities chiefly inorganic, and anthraquinone bodies 0%.

(c) In another example substantially like part (b), 6 parts of cupric sulfate crystals were used with equal effect in place of the sodium nitrobenzene sulfonate.

(d) In a large scale application of the cupric sulfate method illustrated by part (c), 496 pounds of crude benzanthrone containing 347 pounds pure benzanthrone, 74 pounds anthraquinone bodies, and 75 pounds other impurities, was the starting material. The recovered purified crude benzanthrone contained 403 pounds benzanthrone, no anthraquinone-type impurities and 90 pounds other impurities. The increase in content of benzanthrone evidences the conversion of the anthraquinone bodies to benzanthrone.

*Eaxmple 4.*—Crude benzanthrone weighing about 617 parts and containing 480 parts benzanthrone and 74 parts anthraquinone-type impurities (the remainder being inorganic material) was dissolved at about 50° C. in 3000 parts 100% sulfuric acid, and the solution was diluted with 420 parts water. The agitated mixture was then heated gradually, and the following additions in the order given were made: at about 80° C., 110 parts copper sulfate crystals (CuSO$_4$.5H$_2$O) followed by 150 parts glycerine; at about 90° C., 35 parts copper powder; at about 115° C., another 35 parts copper powder. After the mixture reached 125° C. the mass was agitated at about that temperature for about 1 hour at which point a test for presence therein of anthraquinone-type impurities was negative. The charge was drowned in water at about 80° C.; the aqueous mass was boiled for about 1 hour, diluted with more water to between 5% and 10% sulfuric acid acidity, and filtered. The filter cake of benzanthrone was washed with water till acid-free, then with dilute alkali (2% Na$_2$CO$_3$aq) and finally with water until alkali-free. The filter cake of benzanthrone when dried weighed 624 parts and contained 550 parts benzanthrone, no anthraquinone-type impurities, and 74 parts impurities, chiefly inorganic, which were not soluble in benzene.

We claim:

1. A single step process for producing benzanthrone from at least one material of the group consisting of anthraquinone and impurities in crude benzanthrone which impurities have the vatting properties of anthraquinone, said crude benzanthrone being the condensation product of anthraquinone and at least one material of the group consisting of glycerine and acrolein, formed in hot sulfuric acid containing a metallic reducing agent, which comprises maintaining at temperatures between about 122° and about 134° C. a solution of said starting reactant in aqueous sulfuric acid of 89% to 91% strength containing a conditioning agent of the group consisting of cupric sulfate, nitrobenzene sulfonate salts soluble in water, mononitrosophenol, and alkali metal nitrites, while providing together in said solution a compound which is a source of acrolein under the reaction conditions and a reducing agent of the group consisting of iron powder, copper powder, and mixtures thereof anthranol being substantially absent.

2. A process in accordance with claim 1 in which the conditioning agent is cupric sulfate and the compound which is a source of acrolein is glycerine; and the amount of cupric sulfate present in the reaction solution is at least about 0.07 mol per mol of anthraquinone-type reactant present, the amount of reducing metal employed is at least about 2 atoms per mol of anthraquinone-type reactant present and the amount of glycerine employed is at least about 1.1 mols per mol of anthraquinone-type reactant present.

3. A single step process for producing benzanthrone free of anthraquinone-type impurities which comprises maintaining at temperatures between about 124° and about 130° C. a solution containing anthraquinone and about 0.1–0.5 mol of cupric sulfate per mol of anthraquinone present, the solvent being about 5–7 parts by weight (100% $H_2SO_4$ basis) per part of dissolved anthraquinone of 87–90% aqueous sulfuric acid; adding to said solution simultaneously glycerine and ground iron of fineness at least 100 mesh, in total amounts of between about 1.1 and about 1.5 mols of glycerine and between about 2 and about 3 atoms of ground iron per mol of anthraquinone present with anthranol being substantially absent; agitating the resulting reaction mixture at temperatures between about 124° and about 130° C. until a sample gives a negative test for anthraquinone-type impurities; and recovering benzanthrone product from the reaction mixture.

4. A single step process for converting, to benzanthrone, impurities having the vatting properties of anthraquinone and present in crude benzanthrone, said crude benzanthrone being the condensation product of anthraquinone and at least one material of the group consisting of glycerine and acrolein, formed in hot sulfuric acid containing a metallic reducing agent, which process comprises maintaining at temperatures between about 124° and about 130° C. a solution of said crude benzanthrone in 87–90% aqueous sulfuric acid containing cupric sulfate in amounts between about 0.5 and about 2 mols of cupric sulfate per mol of anthraquinone-type impurities (calculated as anthraquinone) in the starting material while providing together in said solution glycerine and reducing agent of the group consisting of iron powder, copper powder, and mixtures thereof, in total amounts between about 1.5 and about 5 mols of glycerine and between about 3 and about 9 atoms of reducing agent per mol of anthraquinone-type impurities (calculated as anthraquinone) in the crude material with anthranol being substantially absent; agitating the reaction mixture at temperatures between about 124° and about 130° C. until a sample gives a negative test for anthraquinone-type impurities; and recovering benzanthrone from the reaction mixture.

MAURICE H. FLEYSHER.
FREDERIC L. SIEVENPIPER.

REFERENCES CITED

The following references are of record in the file of this patent:

UNITED STATES PATENTS

| Number | Name | Date |
|---|---|---|
| 1,601,319 | Peck et al. | Sept. 28, 1926 |
| 1,791,309 | Gubelmann et al. | Feb. 3, 1931 |
| 1,896,147 | Wuertz | Feb. 7, 1933 |